United States Patent
Pan et al.

(10) Patent No.: US 12,244,004 B2
(45) Date of Patent: Mar. 4, 2025

(54) COMPOSITE CATHODE MATERIAL FOR LITHIUM-ION BATTERY, AND VEHICLE

(71) Applicant: BYD COMPANY LIMITED, Guangdong (CN)

(72) Inventors: Yi Pan, Shenzhen (CN); Rong Hao, Shenzhen (CN); Na Chen, Shenzhen (CN); Xiaotao Yuan, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 561 days.

(21) Appl. No.: 17/614,285

(22) PCT Filed: May 27, 2020

(86) PCT No.: PCT/CN2020/092654
§ 371 (c)(1),
(2) Date: Nov. 24, 2021

(87) PCT Pub. No.: WO2020/238968
PCT Pub. Date: Dec. 3, 2020

(65) Prior Publication Data
US 2022/0255066 A1 Aug. 11, 2022

(30) Foreign Application Priority Data
May 28, 2019 (CN) .......................... 201910450988.4

(51) Int. Cl.
*H01M 4/36* (2006.01)
*H01M 4/505* (2010.01)
(Continued)

(52) U.S. Cl.
CPC .......... *H01M 4/366* (2013.01); *H01M 4/505* (2013.01); *H01M 4/525* (2013.01);
(Continued)

(58) Field of Classification Search
CPC ........ H01M 4/366; C01G 53/50; C01G 53/44
See application file for complete search history.

(56) References Cited

U.S. PATENT DOCUMENTS 10,243,201 B2 * 3/2019 Lee ........................ H01M 4/131
10,535,873 B2 * 1/2020 Lee ........................ C01G 53/42
(Continued)

FOREIGN PATENT DOCUMENTS

CN 101997113 A 3/2011
CN 103490060 A 1/2014
(Continued)

OTHER PUBLICATIONS

Machine translation of CN 105870402 (no date) (Year: 0000).*
English Translation of International Search Report from PCT/CN2020/092654 dated Aug. 20, 2020 (2 pages).

*Primary Examiner* — Amanda C. Walke
(74) *Attorney, Agent, or Firm* — Calfee, Halter & Griswold LLP

(57) ABSTRACT

Disclosed herein are a composite cathode material for a lithium-ion battery, a lithium-ion battery, and a vehicle. A core of the cathode material is a lithium-nickel-cobalt-manganese oxide material. A surface layer of the cathode material is a lithium-nickel-cobalt oxide material doped with an element E. There is a transition layer between the core and the surface layer. The transition layer is a lithium-nickel-cobalt-manganese oxide material doped with the element E. A content of the element E in the transition layer shows a decreasing trend in a direction from the surface layer of the cathode material to the core. A general formula for the composition of the transition layer is $Li_{1+m}Ni_{1-x-y-z}Co_xMn_yE_zO_2$. $0 \le m \le 0.1$, $0.01 \le x \le 0.1$, $0.01 \le y \le 0.1$, and $0.01 \le z \le 0.1$. E is at least one of Al, Zr, Ti, Y, Ba or Sr.

17 Claims, 1 Drawing Sheet

(51) Int. Cl.
*H01M 4/525* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01); *H01M 2220/20* (2013.01)

(56) References Cited

U.S. PATENT DOCUMENTS

| | | | | |
|---|---|---|---|---|
| 10,818,916 | B2* | 10/2020 | Shin | H01M 4/0471 |
| 10,854,870 | B2* | 12/2020 | Lee | H01M 4/131 |
| 2020/0119351 | A1* | 4/2020 | Yun | H01M 4/366 |
| 2021/0226203 | A1* | 7/2021 | Liu | H01M 4/525 |

FOREIGN PATENT DOCUMENTS

| | | | |
|---|---|---|---|
| CN | 103500827 A | | 1/2014 |
| CN | 104347853 A | | 2/2015 |
| CN | 104409716 A | | 3/2015 |
| CN | 104577096 A | | 4/2015 |
| CN | 105870402 A | | 8/2016 |
| CN | 106784798 A | | 5/2017 |
| CN | 107359346 A | | 11/2017 |
| CN | 107408667 A | | 11/2017 |
| CN | 107482204 A | | 12/2017 |
| CN | 107585794 A | | 1/2018 |
| CN | 107968202 A | | 4/2018 |
| CN | 108298599 A | | 7/2018 |
| EP | 3312912 A1 | | 4/2018 |
| JP | 11067209 A | | 3/1999 |
| JP | 2010092848 A | | 4/2010 |
| JP | 2014038828 A | | 2/2014 |
| JP | 2015204256 A | | 11/2015 |
| JP | 2016139583 A | | 8/2016 |
| JP | 2016197611 A | | 11/2016 |
| KR | 1020140016314 A | | 2/2014 |
| KR | 20150095237 A | | 8/2015 |
| KR | 20160129764 A | * | 11/2016 |
| KR | 1020170063419 A | | 6/2017 |
| KR | 1020180043077 A | | 4/2018 |
| KR | 20180063862 A | | 6/2018 |
| KR | 20180128203 A | | 12/2018 |
| KR | 1020190063862 A | | 6/2019 |
| KR | 20200145747 A | * | 12/2020 |
| WO | 2006033529 A1 | | 3/2006 |

\* cited by examiner

COMPOSITE CATHODE MATERIAL FOR LITHIUM-ION BATTERY, AND VEHICLE

CROSS-REFERENCE TO RELATED APPLICATIONS

This disclosure is the national stage of PCT International Application No. PCT/CN2020/092654, filed on May 27, 2020, which claims priority to Chinese Patent Application No. 201910450988.4, entitled "COMPOSITE CATHODE MATERIAL FOR LITHIUM-ION BATTERY, LITHIUM-ION BATTERY CATHODE, LITHIUM BATTERY, BATTERY MODULE, BATTERY PACK, AND VEHICLE" filed with the China National Intellectual Property Administration on May 28, 2019, which is incorporated by reference in its entirety.

FIELD

The present disclosure relates to the technical field of battery materials, and in particular, to a composite cathode material for a lithium-ion battery, a lithium-ion battery, and a vehicle.

BACKGROUND

Lithium-ion batteries have been widely applied to portable appliances, electric vehicles, large-scale energy storage devices, and other power supply devices. The main cost and performance bottleneck of a lithium-ion battery lies in internal materials of the battery, including a cathode material, an anode material, an electrolyte material, and a membrane material. Among the four main materials, the quality of the cathode material is a key factor that restricts the performance of the lithium-ion battery.

Currently, commercially available cathode materials mainly include NCM and NCA with a high nickel content used alone and a surface-modified NCM cathode material. However, the two cathode materials still have problems such as an unstable structure and a low capacity and cannot meet the requirements of a lithium-ion battery.

In the related art, capacity retention rate, restoration ratio, and DCIR (direct current internal resistance) change rate are commonly used to characterize performance of a lithium-ion battery. The specific test methods are as follows:

Capacity retention rate: The battery is charged and discharged 3 times at a constant current of 0.33 C (within a voltage range 2.5 V to 4.25 V) at room temperature to obtain a standard capacity C1 of the battery and then is fully charged at the constant current of 0.33 C, and a cut-off voltage is 4.25 V. After the charge is completed, a 60-day storage experiment is performed on the battery at 60° C. After the storage is completed, the battery is discharged to 2.5 V at the constant current of 0.33 C at room temperature to obtain a discharge capacity C2, and a capacity retention rate is C2/C1.

Restoration ratio: After the storage at 60° C., the battery is charged and discharged for three cycles at the constant current of 0.33 C at room temperature. A last discharge capacity is recorded as C3, and the capacity restoration rate is C3/C1.

DCIR change rate: The battery is charged to a state of charge (SOC) of 60% at a constant current of 0.33 C at 25° C., and a DCIR R1 is tested when discharging for 30 s at a constant current of 1.5 C and then is charged to an SOC of 100%. The battery is stored for 60 days at 60° C. After the storage is completed, the battery is discharged to 2.5 V at a constant current of 0.33 C at room temperature and then is charged to an SOC of 60% at a constant current of 0.33 C, and a DCIR R2 is tested when discharging for 30 s at the constant current of 1.5 C. The DCIR change rate is (R2−R1)/R1.

SUMMARY

The technical solution of the present disclosure is completed by the inventor based on the following findings: Currently, commercially available cathode materials mainly include NCM and NCA with a high nickel content used alone and a surface-modified NCM cathode material. Advantages and disadvantages of NCM: NCM with a Ni molar content ≥80% has an unstable surface structure and is highly likely to generate a rock salt layer structure on the surface. A ternary material with a high Ni content has a high residual alkali content on the surface, and is likely to generate gel in a pulping process and has poor treatment performance. The ternary material with a high Ni content has poor thermal stability, and is prone to oxygen evolution in high voltage and high temperature environments, resulting in thermal runaway. Advantages and disadvantages of NCA: An NCA material with a Ni molar content ≥80% has better structural stability and surface stability than NCM due to the contribution of the element Al, but an NCA material with the same Ni content has a lower specific capacity than NCM. An uncoated NCM with a high nickel content has a relatively high surface activity, and has more side reactions in both an atmospheric environment and in a battery. Residual alkali on the surface of NCM with a high nickel content in the atmospheric environment keeps increasing, and at the same time there may be a rock salt phase structure. The surface of a battery may react with an electrolyte, causing oxidation of the electrolyte and gas production inside the battery, resulting in performance deterioration of the battery.

The objective of the present disclosure is to provide a composite cathode material for a lithium-ion battery, a lithium-ion battery, and a vehicle to overcome the problems of a rock salt phase on the surface, an unstable structure, and performance deterioration of a battery when uncoated NCM with a high nickel content is used alone in the related art. The composite cathode material for a lithium-ion battery of the present disclosure is sequentially a lithium-nickel-cobalt-manganese oxide material (a core), a lithium-nickel-cobalt-manganese oxide material doped with an element E (a transition layer), and a lithium-nickel-cobalt oxide material doped with the element E (a surface layer) from inside to outside. However, the composite cathode material for a lithium-ion battery does not have a structure with a clear core-shell boundary, which is more conducive to maintaining the stability of the material structure. The rate, cycle, and storage performance of the cathode material are significantly improved compared with a conventional lithium-nickel-cobalt-manganese oxide material (Ni mol %≥80%), and Li/Ni mixing in a lithium-nickel-cobalt-manganese oxide material is reduced to ensure a capacity of the material.

To achieve the above objective, a first aspect of the present disclosure provides a cathode material for a lithium-ion battery. A core of the cathode material is a lithium-nickel-cobalt-manganese oxide material. A surface layer of the cathode material is a lithium-nickel-cobalt oxide material doped with an element E. There is a transition layer between the core and the surface layer. The transition layer is a lithium-nickel-cobalt-manganese oxide material doped with the element E. A content of the element E in the transition layer shows a decreasing trend in a direction from the surface layer of the cathode material to the core.

A general formula for the composition of the transition layer is $Li_{1+m}Ni_{1-x-y-z}Co_xMn_yE_zO_2$, where $0 \leq m \leq 0.1$, $0.01 \leq x \leq 0.1$, $0.01 \leq y \leq 0.1$, and $0.01 \leq z \leq 0.1$.

E is one or more of Al, Zr, Ti, Y, Ba, and Sr.

A second aspect of the present disclosure provides a lithium-ion battery, including a cathode and an anode. The cathode is prepared by using the foregoing composite cathode material for a lithium-ion battery.

A third aspect of the present disclosure provides a vehicle, including the foregoing lithium-ion battery.

The additional aspects and advantages of the present disclosure will be provided in the following description, some of which will become apparent from the following description or may be learned from practices of the present disclosure.

BRIEF DESCRIPTION OF THE DRAWINGS

The foregoing additional aspects and advantages of the present disclosure will become apparent and comprehensible in the description made with reference to the following accompanying drawings. In the figures.

DESCRIPTION OF REFERENCE NUMERALS

Figure 1:
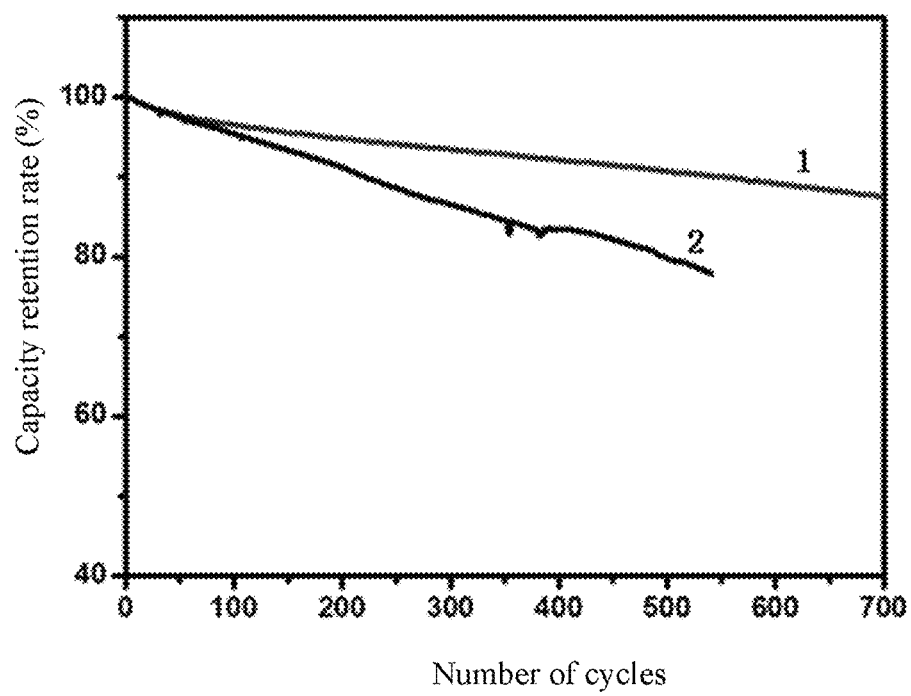
FIG. 1 is a comparison diagram of the cycle performance of a cathode material prepared according to Contrast Embodiment 1 and Embodiment 1.

Curve 1: Cycle performance of an NCM/NCMA/NCA composite material prepared according to Embodiment 1 at 45° C.; and Curve 2: Cycle performance of NCM prepared according to Contrast Embodiment 1 without a surface coating at 45° C.

DETAILED DESCRIPTION

The endpoints and any values of the ranges disclosed herein are not limited to the precise range or value, and these ranges or values should be understood to include values close to these ranges or values. A numerical range between endpoint values of each range, a numerical range between an endpoint value and an individual point value of each range, and a numerical range between individual point values may be combined with each other to obtain one or more new numerical ranges, and such numerical ranges should be considered to be specifically disclosed herein.

To make the technical problems to be solved by the present disclosure, technical solutions, and beneficial effects more comprehensible, the following further describes the present disclosure in detail with reference to the accompanying drawings and embodiments. It should be understood that the specific embodiments described herein are merely used for explaining the present disclosure instead of limiting the present disclosure.

A first aspect of the present disclosure provides a composite cathode material for a lithium-ion battery. A core of the cathode material is a lithium-nickel-cobalt-manganese oxide material. A surface layer of the cathode material is a lithium-nickel-cobalt oxide material doped with an element E. There is a transition layer between the core and the surface layer. The transition layer is a lithium-nickel-cobalt-manganese oxide material doped with the element E. A content of the element E in the transition layer shows a decreasing trend in a direction from the surface layer of the cathode material to the core.

A general formula for the composition of the transition layer (the lithium-nickel-cobalt-manganese oxide material doped with the element E) is $Li_{1+m}Ni_{1-x-y-z}Co_xMn_yE_zO_2$, where $0 \leq m \leq 0.1$, $0.01 \leq x \leq 0.1$, $0.01 \leq y \leq 0.1$, and $0.01 \leq z \leq 0.1$. For example, m is 0, 0.01, . . . , 0.09 or 0.1, x is 0, 0.01, . . . , 0.09 or 0.1, y is 0, 0.01, . . . , 0.09 or 0.1, and z is 0, 0.01, . . . , 0.09 or 0.1.

E is one or more of Al, Zr, Ti, Y, Ba, and Sr.

According to an embodiment of the present disclosure, the general formula for the composition of the transition layer is $Li_{1+m}Ni_{1-x-y-z}Co_xMn_yE_zO_2$, where $0 \leq m \leq 0.05$, $0.02 \leq x \leq 0.06$, $0.02 \leq y \leq 0.06$, and $0.02 \leq z \leq 0.06$.

According to another embodiment of the present disclosure, the cathode material may be a single crystal material.

According to still another embodiment of the present disclosure, the content of the element E in the transition layer shows a decreasing trend. It should be noted that "decreasing" may be either in a gradient or in a non-gradient.

According to yet another embodiment of the present disclosure, the cathode material may be considered as a core-shell-like structure. That is, the cathode material may sequentially include a core, a transition layer, and a surface layer from inside to outside. However, the doped element E is gradually diffused from the surface layer (surface) to a bulk phase (the transition layer) in a sintering process. Therefore, there is no clear boundary between the core and a shell although the formed structure is sequentially a lithium-nickel-cobalt-manganese oxide material, a lithium-nickel-cobalt-manganese oxide material doped with the element E, and a lithium-nickel-cobalt oxide material doped with the element E from inside to outside, which is still different from a simple surface coating structure. Therefore, the cathode material may be considered as a core-shell-like structure that is in fact an integral structure different from a core-shell structure.

According to still yet another embodiment of the present disclosure, a content of the element E in the surface layer accounts for 0.5% to 8% by weight of a total weight of the cathode material. The content of the element E in the transition layer accounts for 0.05% to 5% by weight of the total weight of the cathode material. For example, the content of the element E in the surface layer accounts for 0.5% by weight, 0.6% by weight, . . . , 7.9% by weight or 8% by weight of the total weight of the cathode material. The content of the element E in the transition layer accounts for 0.05% by weight, 0.06% by weight, . . . , 4.99% by weight or 5% by weight of the total weight of the cathode material. According to a specific embodiment of the present disclosure, the content of the element E in the surface layer accounts for 2% to 5% by weight of the total weight of the cathode material. The content of the element E in the transition layer accounts for 0.1% to 2% by weight of the total weight of the cathode material.

In the present disclosure, the doped element gradually permeates into a bulk phase of a lithium-nickel-cobalt-manganese oxide material in the form of a concentration gradient in a sintering process when a coating layer is added to the core of the cathode material. The doped element can effectively reduce a degree of Li/Ni mixing in the bulk phase of the lithium-nickel-cobalt-manganese oxide material, and reduce a degree of change on a c-axis of the material in delithiation and lithiation processes, all of which can improve the stability of the lattice of the material. In addition, doping can also reduce a volume change in the material in the delithiation and lithiation processes and reduce cracking. The transition layer formed in a diffusion process also provides a buffer for the expansion and contraction of an inner layer and a shell layer in a cycle process to avoid material cracking. In conclusion, the doped element can stabilize the material structure, reduce cracking, reduce side reactions with an electrolyte, and reduce gas production.

According to a specific embodiment of the present disclosure, the element E is Al. The surface layer NCA benefits from a stable Al—O bond, which can inhibit an oxygen evolution phenomenon of a material with a high nickel content, to provide the material with adequate surface structure stability. The core (NCM) has a higher gram capacity for the design of a high nickel content (Ni>80%). In addition, thanks to the protection of the surface layer (NCA), the core (NCM) with a high nickel content always maintains a stable layer structure without the transition from a layer to a salt rock layer, thereby ensuring the stable cycle performance and rate performance of the material. Furthermore, the transition layer (NCMA) formed in a sintering process has the foregoing advantages of the surface layer and the core, and provides a buffer for the expansion and contraction of the core and the surface layer in a cycle process, thereby ensuring that an inner surface layer does not cause particle cracking and performance deterioration due to differences in expansion and contraction in a cycle process.

According to another embodiment of the present disclosure, a general formula for the composition of the core (the lithium-nickel-cobalt-manganese oxide material) is $Li_{1+m}Ni_{1-x-y}Co_xMn_yO_2$, where m, x, and y are defined as described above in the general formula for the composition of the transition layer. Details are not described herein again. According to a specific embodiment of the present disclosure, a molar content of nickel in the lithium-nickel-cobalt-manganese oxide material (the core) accounts for not less than 80% of a total molar amount of the core. According to a specific example of the present disclosure, the molar content of nickel in the lithium-nickel-cobalt-manganese oxide material (the core) accounts for not less than 90% of the total molar amount of the core. According to still another embodiment of the present disclosure, the lithium-nickel-cobalt-manganese oxide material (the core) may have an average particle size of 1.5 μm to 2.5 μm, for example, 1.5 μm, 1.6 μm, . . . , 2.4 μm or 2.5 μm. Furthermore, according to yet another embodiment of the present disclosure, with the total weight of the cathode material as a reference, a content of the core accounts for 80% to 98% by weight, for example, 80% by weight, 80.1% by weight, . . . , 97.9% by weight or 98% by weight. According to a specific embodiment of the present disclosure, with the total weight of the cathode material as a reference, the content of the core accounts for 90% to 98% by weight.

According to still yet another embodiment of the present disclosure, a general formula for the composition of the surface layer (the lithium-nickel-cobalt oxide material doped with the element E) may be $Li_{1+m}Ni_{1-x-y1}Co_xE_{y1}O_2$, where m and x are defined as described above in the general formula for the composition of the transition layer. Details are not described herein again. $0.01 \leq y1 \leq 0.15$. For example, y1 is 0.01, 0.02, . . . , 0.14 or 0.15. According to a specific embodiment of the present invention, $0.05 \leq y1 \leq 0.1$. According to an embodiment of the present invention, a thickness of the lithium-nickel-cobalt oxide material doped with the element E (the surface layer) may be 5 nm to 50 nm, for example, 5 nm, 6 nm, . . . , 49 nm or 50 nm. According to a specific embodiment of the present invention, the thickness of the lithium-nickel-cobalt oxide material doped with the element E (the surface layer) may be 5 nm to 20 nm.

According to another embodiment of the present disclosure, with the total weight of the cathode material as a reference, a content of the lithium-nickel-cobalt oxide material doped with the element E (the surface layer) accounts for at most 8% by weight, for example, 1% by weight, 2% by weight, . . . , 7% by weight or 8% by weight. According to a specific embodiment of the present disclosure, with the total weight of the cathode material as a reference, the content of the lithium-nickel-cobalt oxide material doped with the element E (the surface layer) accounts for 1% to 2% by weight. Because the specific capacity of the lithium-nickel-cobalt oxide material doped with the element E (the surface layer) is less than that of the lithium-nickel-cobalt-manganese oxide material (the core) with the same nickel content, an excessive high content of the lithium-nickel-cobalt oxide material doped with the element E is not conducive to the overall specific capacity of the material. Therefore, the surface layer of the cathode material in the present disclosure is a material with a relatively high content of aluminum. In a direction to the core, the content of aluminum decreases in a gradient. In the present disclosure, the content of the lithium-nickel-cobalt oxide material doped with the element E is restricted within the foregoing range, so as to ensure that the material has both a high capacity and adequate stability.

According to still another embodiment of the present disclosure, the lithium-nickel-cobalt-manganese oxide material (the transition layer) doped with the element E may have a thickness of 5 nm to 200 nm, for example, 5 nm, 6 nm, . . . , 199 nm, . . . , or 200 nm. According to a specific embodiment of the present disclosure, the lithium-nickel-cobalt-manganese oxide material doped with the element E (the transition layer) has a thickness of 5 nm to 50 nm. According to still another embodiment of the present invention, with the total weight of the cathode material as a reference, a content of the transition layer accounts for 0.5% to 12% by weight, for example, 0.5% by weight, 0.6% by weight, . . . , 11.9% by weight or 12% by weight. According to a specific embodiment of the present disclosure, with the total weight of the cathode material as a reference, the content of the transition layer accounts for 1% to 5% by weight.

According to yet another embodiment of the present disclosure, the cathode material may be primary particles or secondary particles formed by agglomeration of the primary particles. In the present disclosure, unless otherwise specified, the cathode material is in the form of single crystals. However, a small number of small single crystals, for example, two single crystals, three single crystals or four single crystals, may cluster together. According to an embodiment of the present disclosure, the primary particles may have an average particle size of 1.5 μm to 2.5 μm. For example, the primary particles may have an average particle size of 1.5 μm, 1.6 μm, . . . , 2.4 μm or 2.5 μm. The secondary particles may have an average particle size of 4.1 μm to 4.3 μm. For example, the secondary particles have an average particle size of 4.1 μm, 4.2 μm or 4.3 μm. According to a specific embodiment of the present disclosure, the cathode material is a single crystal material.

According to another embodiment of the present disclosure, a content of lithium hydroxide on the surface of the cathode material may be below 1100 ppm, and a content of lithium carbonate on the surface of the cathode material may be below 1750 ppm.

In the present disclosure, the content of lithium hydroxide and the content of lithium carbonate on the surface of the cathode material are controlled within the foregoing ranges, so that the cathode material can have adequate surface stability, thereby facilitating a storage process of the material and helping to maintain the stability of a high temperature cycle.

According to an embodiment of the present disclosure, a method for preparing the cathode material may include:

(a) adjusting the pH value of an aqueous solution system containing a nickel salt, a cobalt salt, and a manganese salt to co-precipitate a nickel-cobalt-manganese ternary hydroxide precursor;

(b) continuing to add the nickel salt, the cobalt salt, and a salt containing the element E, and adjusting the pH value to co-precipitate to form the nickel-cobalt-manganese ternary hydroxide precursor coated with nickel, cobalt, and the element E; and (c) mixing the nickel-cobalt-manganese ternary hydroxide precursor coated with nickel, cobalt, and the element E with lithium hydroxide, and performing sintering, crushing, and washing with water to prepare a composite cathode material for a lithium-ion battery.

According to a specific embodiment of the present disclosure, the pH value in step (a) may be the same as or different from the pH value in step (b). The pH values in step (a) and step (b) may be separately 10 to 12. For example, the pH values are separately 10, 10.1, . . . , 11.9 or 12.

According to another specific embodiment of the present disclosure, in step (c), a sintering temperature may be 800° C. to 950° C., a time is 5 h to 15 h, and a heating rate may be 2° C./min to 10° C./min. For example, the sintering temperature is 800° C., 801° C., . . . , 949° C. or 950° C. The time is 5 h, 5.1 h, . . . , 14.9 h or 15$h$. The heating rate is 2° C./min, 2.1° C./min, 9.9° C./min or 10° C./min. In the present disclosure, the sintering temperature is relatively high, which is different from a sintering temperature in conventional coating and sintering of a ternary material. At this temperature, an oxide can form a uniform coating layer on the surface of the material. In addition, due to the effect of thermal diffusion, some of metal elements in the coated oxide enter the lattice of a material (a lithium-nickel-cobalt-manganese oxide material) of the core in the form of doping, and finally a multi-level structure of a lithium-nickel-cobalt-manganese oxide material, a lithium-nickel-cobalt-manganese oxide material doped with the element E, and a lithium-nickel-cobalt oxide material doped with the element E (NCM/NCMA/NCA) is obtained.

According to still another specific embodiment of the present disclosure, the nickel salt is one or more of nickel sulfate, nickel nitrate, and nickel acetate. According to a specific embodiment of the present invention, the nickel salt is nickel sulfate. The cobalt salt is one or more of cobalt sulfate, cobalt nitrate, and cobalt acetate. According to a specific embodiment of the present invention, the cobalt salt is cobalt sulfate. The manganese salt is one or more of manganese sulfate, manganese nitrate, and manganese acetate. According to a specific embodiment of the present invention, the manganese salt is manganese sulfate.

According to yet another specific embodiment of the present disclosure, a metal oxide containing the element E may be $Al_2O_3$, $ZrO_2$, $TiO_2$, $Y_2O_3$, BaO or SrO.

According to still yet another specific embodiment of the present disclosure, in step (c), a cyclone mill may be used to perform crushing. A particle size after the crushing is not specifically limited, as long as the crushing is performed to a particular extent. In addition, the washing with water is not specifically limited, and may be performed under a condition known to a person skilled in the art.

According to another embodiment of the present disclosure, the method for preparing the cathode material may further include:

(d) adding a precipitant dropwise to an aqueous solution containing the nickel salt, the cobalt salt, and the manganese salt for a co-precipitation reaction to prepare the nickel-cobalt-manganese ternary hydroxide precursor;

(e) mixing the nickel-cobalt-manganese ternary hydroxide precursor with lithium hydroxide, and performing calcination, crushing, and washing with water to prepare a lithium-nickel-cobalt-manganese oxide material; and (f) mechanically mixing the lithium-nickel-cobalt-manganese oxide material with the metal oxide containing the element E, a nickel-cobalt binary hydroxide precursor, and LiOH, and performing calcination to prepare a composite cathode material for a lithium-ion battery.

According to a specific embodiment of the present disclosure, in steps (d) and (f), the nickel salt, the cobalt salt, the manganese salt, and the metal oxide containing the element E are as described above. Details are not described herein again.

According to another specific embodiment of the present disclosure, in step (d), the precipitant may be sodium hydroxide and/or aqua-ammonia. In addition, in the present disclosure, a sodium hydroxide solution and ammonia are added dropwise to the aqueous solution containing the nickel salt, the cobalt salt, and the manganese salt for a co-precipitation reaction. After a precipitate is precipitated, the precipitate is filtered, washed, and dried to obtain a precursor for preparing a ternary material, that is, the nickel-cobalt-manganese ternary hydroxide precursor. However, the filtering, washing, and drying are not specifically limited, and may be performed under a condition known to a person skilled in the art.

According to still another specific embodiment of the present disclosure, a molar concentration of the sodium hydroxide solution may be 0.1 mol/L to 1 mol/L, and a molar concentration of the aqua-ammonia may be 0.1 mol/L to 1 mol/L. For example, the molar concentration of the sodium hydroxide solution may be 0.1 mol/L, 0.2 mol/L, . . . , 0.9 mol/L or 1 mol/L. The molar concentration of the ammonia may be 0.1 mol/L, 0.2 mol/L, . . . , 0.9 mol/L or 1 mol/L. In addition, the water is not specifically limited. According to a specific example of the present disclosure, the water is deionized water.

According to yet another specific embodiment of the present disclosure, in step (f), a calcination temperature may be 800° C. to 950° C., a time is 8 h to 15 h, and a heating rate may be 2° C./min to 10° C./min. For example, the calcination temperature is 800° C., 801° C., . . . , 949° C. or 950° C., the time is 8 h, 8.1 h, . . . , 14.9 h, and 15 h, and the heating rate is 2° C./min, 2.1° C./min, 9.9° C./min or 10° C./min.

Furthermore, according to still yet another specific embodiment of the present disclosure, in step (f), the mechanical mixing may be performed in a manner of ball milling, and the ball milling may include the following conditions: a rotation speed is 200 rpm to 600 rpm, and a time is 2 h to 4 h. For example, the rotation speed is 200 rpm, 210 rpm, . . . , 590 rpm or 600 rpm, and the time is 2 h, 2.1 h, . . . , 3.9 h or 4 h.

A second aspect of the present disclosure provides a lithium-ion battery, including a cathode and an anode. The cathode is prepared by using the foregoing composite cathode material for a lithium-ion battery. The cathode is prepared by mixing the foregoing cathode material with a conductive agent and a binder to obtain a slurry and coating the slurry on an aluminum foil. It should be noted that a person skilled in the art may select the conductive agent, the binder, and a mixing ratio thereof according to an actual requirement. Details are not described herein again.

According to an embodiment of the present disclosure, the anode is obtained by mixing artificial graphite with a binder to obtain a slurry and coating the slurry on a copper foil. It should be noted that a person skilled in the art may select the binder for preparing the anode and a mixing ratio of the binder and the artificial graphite according to an actual requirement. Details are not described herein again. The lithium-ion battery of the present disclosure includes either a solid lithium-ion battery or a liquid lithium-ion battery. In the case of a liquid lithium-ion battery, positive and negative electrode sheets and membranes need to be prepared in a winding manner to obtain a battery core, and the battery is obtained through operations of putting the battery core into a battery case, baking, electrolyte filling, welding and sealing, chemical formation, and aging.

A third aspect of the present disclosure provides a vehicle, including the foregoing lithium-ion battery.

The present disclosure is described below with reference to specific embodiments. It is to be noted that these embodiments are merely illustrative and are not intended to limit the present disclosure in any way.

In the following embodiments and contrast embodiments:

1. Gram capacity of the cathode material: Within a voltage range of 2.5 V to 4.25 V, the material is charged to 4.25 V at a constant current of ⅓ C and a constant voltage, and a cut-off current is 0.05 C during the charging at a constant voltage.

2. Cycle performance: A 1 C/1 C cycle test is performed on the battery at 45° C. within the voltage range of 2.5 V to 4.25 V. The battery is first charged to 4.25 V at a constant current of 1 C and is then charged at a constant voltage, and a cut-off current is 0.2 C. A capacity retention rate after 500 cycles is taken for comparison.

3. Storage performance: A storage experiment is performed on the battery at 60° C. for 60 days to perform comparison to find a capacity retention rate and a restoration ratio and changes in a DCIR change rate and a thickness of the battery.

4. An XRD is used for testing an I(003)/I(104) ratio, where XRD is purchased from Bruker and the model is Bruker D8.

Embodiment 1

The embodiment is intended to describe a cathode material prepared by using the method of the present disclosure.

(1) Nickel sulfate, cobalt sulfate, and manganese sulfate are dissolved in deionized water. A total molar concentration of nickel sulfate, cobalt sulfate, and manganese sulfate is 1 M. A molar ratio of nickel to cobalt to manganese is 9:1:1. A sodium hydroxide solution and ammonia are added dropwise to the foregoing solution at the same time. The pH of the solution is adjusted to 11. After a precipitate is precipitated, a nickel-cobalt-manganese ternary hydroxide precursor is obtained. A concentration of the sodium hydroxide is 0.5 M, and a concentration of the ammonia is 0.5 M.

(2) A solution of nickel sulfate, cobalt sulfate, and aluminum sulfate continues to be added to the solution of the precursor obtained above. A total molar concentration of nickel, cobalt, and aluminum in the solution is 1 M. A molar ratio of nickel to cobalt to aluminum is 80:5:15. The pH is controlled for nickel, cobalt, and aluminum precipitates to be coated on the surface of the nickel-cobalt-manganese ternary hydroxide precursor obtained above. A precipitate obtained is aged for 12 h at room temperature. The precipitates are centrifuged, washed with deionized water 3 times or 4 times, and is then vacuum dried at 70° C. to obtain a precursor.

(3) The precursor obtained above is mixed with lithium hydroxide (the molar amount of lithium is 5% more than that of metal), and the mixture is sintered in an oxygen atmosphere. The mixture is heated to 875° C. at a rate of 5° C./min, kept at the temperature for 10 h, and then cooled naturally. The sintered sample is crushed and sieved to obtain a finished product. A 325-mesh sieve is used. Because a sintering temperature is relatively high, an oxide may form a uniform coating layer NCA on the surface of a material. Due to the effect of thermal diffusion, the element Al on the surface enters the lattice of an NCM material in the form of doping. A content of the element Al decreases in a direction from the surface layer to the core. Eventually, multi-level structure single crystal nanoparticles of NCM/NCMA/NCA are obtained.

With the use of the above experimental conditions:

The prepared cathode material is an ellipsoidal single crystal material with an average particle size of 2.2 μm. A content of the element Al in the surface layer accounts for 3% by weight of the total weight of the cathode material. A content of the element Al in the transition layer accounts for 1.5% by weight of the total weight of the cathode material. The content of the element Al in the transition layer shows a decreasing trend in the direction from the surface layer of the cathode material to the core.

With the total weight of the cathode material as a reference, a content of the surface layer is 2.5% by weight, the content of the transition layer is 6.5% by weight, and the content of the core is 91% by weight.

NCM is $Li_{1+m}Ni_{1-x-y}Co_xMn_yO_2$. NCA is $Li_{1+m}Ni_{1-x-y1}Co_xAl_{y1}O_2$. $0.01 \leq y1 \leq 0.15$. NCMA is $Li_{1+m}Ni_{1-x-y-z}Co_xM-n_yAl_zO_2$. $0 \leq m \leq 0.1$, $0.01 \leq x \leq 0.05$, $0.01 \leq y \leq 0.05$, and $0.01 \leq z \leq 0.1$. An average particle size of NCM is 2.2 μm. A thickness of NCA is approximately 20 nm. A thickness of NCMA is approximately 40 nm.

As a result, the performance of the prepared cathode material is tested as shown in Tables 1 and 2. Table 1 shows a content of free lithium on the surface of the cathode material, and Table 2 shows the I(003)/I(104) ratio.

Figure 2:
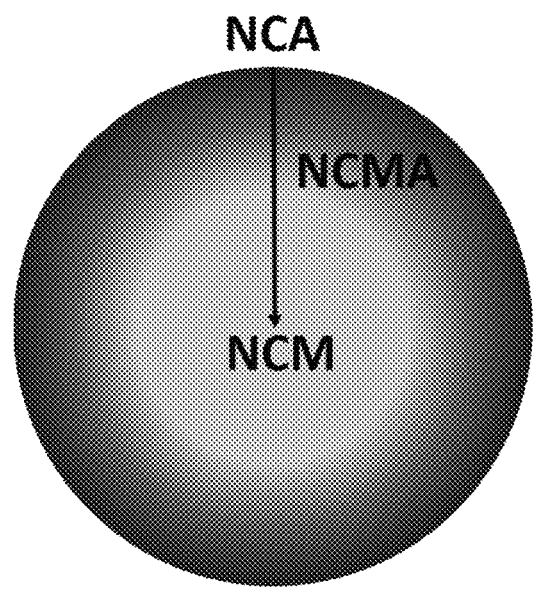
FIG. 2 is a schematic diagram of a cross section of a composite cathode material for a lithium-ion battery prepared by using the present disclosure.

In addition, FIG. 2 is a schematic diagram of a cross section of a composite cathode material for a lithium-ion battery prepared by using the present disclosure, that is, a schematic diagram of a cross section of a single crystal particle of an NCM/NCMA/NCA composite material prepared according to the method of Embodiment 1. The black part in the outer layer represents NCA, the white part in the middle represents NCM, and the change from black to white from the surface layer to the core represents a decreasing content of the element Al.

Embodiment 2

The embodiment is intended to describe a cathode material prepared by using the method of the present disclosure.

A cathode material is prepared according to a method the same as that in Embodiment 1. Differences lie in that aluminum in the general formula of the surface layer and the transition layer of the cathode material is replaced with zirconium and the usage of nickel sulfate, cobalt sulfate, manganese sulfate, lithium hydroxide, and zirconium is changed such that:

The prepared cathode material is an ellipsoidal single crystal material with an average particle size of 2.1 μm. A content of the element Zr in the surface layer accounts for 4% by weight of the total weight of the cathode material. A content of the element Zr in the transition layer accounts for 2% by weight of the total weight of the cathode material. The content of the element Zr in the transition layer shows a decreasing trend in the direction from the surface layer of the cathode material to the core.

With the total weight of the cathode material as a reference, the content of the surface layer is 2.5% by weight, the content of the transition layer is 6.5% by weight, and the content of the core is 91% by weight.

NCM is $Li_{1+m}Ni_{1-x-y}Co_xMn_yO_2$. NCA is $Li_{1+m}Ni_{1-x-y1}Co_xZr_{y1}O_2$. $0.01 \le y1 \le 0.15$. NCMA is $Li_{1+m}Ni_{1-x-y-z}Co_xMn_yZr_zO_2$. $0 \le m \le 0.1$, $0.01 \le x \le 0.05$, $0.01 \le y \le 0.05$, and $0.01 \le z \le 0.1$. The average particle size of NCM is 2.2 μm. The thickness of NCA is approximately 20 nm. The thickness of NCMA is approximately 40 nm.

As a result, the performance of the prepared cathode material is tested as shown in Tables 1 and 2. Table 1 shows the content of free lithium on the surface of the cathode material, and Table 2 shows the I(003)/I(104) ratio.

Embodiment 3

The embodiment is intended to describe a cathode material prepared by using the method of the present disclosure.

A cathode material is prepared according to a method the same as that in Embodiment 1. Differences lie in that aluminum in the general formula of the surface layer and the transition layer of the cathode material is replaced with strontium and the usage of nickel sulfate, cobalt sulfate, manganese sulfate, sodium hydroxide, ammonia, lithium hydroxide, and strontium is changed such that:

The prepared cathode material is an ellipsoidal single crystal material with an average particle size of 2.0 μm. A content of the element Sr in the surface layer accounts for 4% by weight of the total weight of the cathode material. A content of the element Sr in the transition layer accounts for 2% by weight of the total weight of the cathode material. The content of the element Sr in the transition layer shows a decreasing trend in the direction from the surface layer of the cathode material to the core.

With the total weight of the cathode material as a reference, the content of the surface layer is 2.5% by weight, the content of the transition layer is 6.5% by weight, and the content of the core is 91% by weight.

NCM is $Li_{1+m}Ni_{1-x-y}Co_xMn_yO_2$. NCA is $Li_{1+m}Ni_{1-x-y1}Co_xSr_{y1}O_2$. $0.01 \le y1 \le 0.15$. NCMA is $Li_{1+m}Ni_{1-x-y-z}Co_xMn_ySr_zO_2$. $1 \le m \le 1.1$, $0.01 \le x \le 0.05$, $0.01 \le y \le 0.05$, and $0.01 \le z \le 0.1$. The average particle size of NCM is 2.0 μm. The thickness of NCA is approximately 20 nm. The thickness of NCMA is approximately 40 nm.

As a result, the performance of the prepared cathode material is tested as shown in Tables 1 and 2. Table 1 shows the content of free lithium on the surface of the cathode material, and Table 2 shows the I(003)/I(104) ratio.

Embodiment 4

The embodiment is intended to describe a cathode material prepared by using the method of the present disclosure.

A cathode material is prepared according to a method the same as that in Embodiment 1. A difference lies in that a content of aluminum in the general formula of the surface layer and the transition layer of the cathode material is reduced such that:

The content of the element Al in the surface layer accounts for 1.5% by weight of the total weight of the cathode material. The content of the element Al in the transition layer accounts for 0.8% by weight of the total weight of the cathode material. The content of the element Al in the transition layer shows a decreasing trend in the direction from the surface layer of the cathode material to the core.

With the total weight of the cathode material as a reference, the content of the surface layer is 2.5% by weight, the content of the transition layer is 6.5% by weight, and the content of the core is 91% by weight.

NCM is $Li_{1+m}Ni_{1-x-y}Co_xMn_yO_2$. NCA is $Li_{1+m}Ni_{1-x-y1}Co_xAl_{y1}O_2$. $0.01 \le y1 \le 0.15$. NCMA is $Li_{1+m}Ni_{1-x-y-z}Co_xMn_yAl_zO_2$. $0 \le m \le 0.1$, $0.01 \le x \le 0.05$, $0.01 \le y \le 0.05$, and $0.01 \le z \le 0.1$. The average particle size of NCM is 2.2 μm. The thickness of NCA is approximately 20 nm. The thickness of NCMA is approximately 40 nm.

As a result, the performance of the prepared cathode material is tested as shown in Tables 1 and 2. Table 1 shows the content of free lithium on the surface of the cathode material, and Table 2 shows the I(003)/I(104) ratio.

Embodiment 5

The embodiment is intended to describe a cathode material prepared by using the method of the present disclosure.

A cathode material is prepared according to a method the same as that in Embodiment 1. A difference lies in that a content of aluminum in the general formula of the surface layer and the transition layer of the cathode material is reduced such that:

The content of the element Al in the surface layer accounts for 4% by weight of the total weight of the cathode material. The content of the element Al in the transition layer accounts for 2% by weight of the total weight of the cathode material. The content of the element Al in the transition layer shows a decreasing trend in the direction from the surface layer of the cathode material to the core.

With the total weight of the cathode material as a reference, the content of the surface layer is 3.5% by weight, the content of the transition layer is 5.5% by weight, and the content of the core is 91% by weight.

NCM is $Li_{1+m}Ni_{1-x-y}Co_xMn_yO_2$. NCA is $Li_{1+m}Ni_{1-x-y1}Co_xAl_{y1}O_2$. $0.01 \le y1 \le 0.15$. NCMA is $Li_{1+m}Ni_{1-x-y-z}Co_xMn_yAl_zO_2$. $0 \le m \le 0.1$, $0.01 \le x \le 0.05$, $0.01 \le y \le 0.05$, and $0.01 \le z \le 0.1$. The average particle size of NCM is 2.2 The thickness of NCA is approximately 20 nm. The thickness of NCMA is approximately 40 nm.

As a result, the performance of the prepared cathode material is tested as shown in Tables 1 and 2. Table 1 shows the content of free lithium on the surface of the cathode material, and Table 2 shows the I(003)/I(104) ratio.

Embodiment 6

The embodiment is intended to describe a cathode material prepared by using the method of the present disclosure.

A cathode material is prepared according to a method the same as that in Embodiment 1. Differences lie in that the doping and coating elements are kept unchanged, and a content of nickel in the ternary precursor in step (1) is changed to 95 mol %.

The content of the element Al in the surface layer accounts for 3% by weight of the total weight of the cathode material. The content of the element Al in the transition layer accounts for 1.5% by weight of the total weight of the cathode material. The content of the element Al in the transition layer shows a decreasing trend in the direction from the surface layer of the cathode material to the core.

With the total weight of the cathode material as a reference, the content of the surface layer is 3% by weight, the content of the transition layer is 5.5% by weight, and the content of the core is 91.5% by weight.

NCM is $Li_{1+m}Ni_{1-x-y}Co_xMn_yO_2$. NCA is $Li_{1+m}Ni_{1-x-y1}Co_xAl_{y1}O_2$. $0.01 \leq y1 \leq 0.15$. NCMA is $Li_{1+m}Ni_{1-x-y-z}Co_xMn_yAl_zO_2$. $0 \leq m \leq 0.1$, $0.01 \leq x \leq 0.05$, $0.01 \leq y \leq 0.05$, and $0.01 \leq z \leq 0.1$. The average particle size of NCM is 2.2 The thickness of NCA is approximately 20 nm. The thickness of NCMA is approximately 40 nm.

As a result, the performance of the prepared cathode material is tested as shown in Tables 1 and 2. Table 1 shows the content of free lithium on the surface of the cathode material, and Table 2 shows the I(003)/I(104) ratio.

Embodiment 7

The embodiment is intended to describe a cathode material prepared by using the method of the present disclosure.

A cathode material is prepared according to a method the same as that in Embodiment 1. A difference lies in that aluminum in the general formula of the surface layer and the transition layer of the cathode material is replaced with a mixture of aluminum and zirconium such that:

A total content of the element Al and the element Zr in the surface layer accounts for 3% by weight of the total weight of the cathode material. A total content of the element Al and the element Zr in the transition layer accounts for 1.5% by weight of the total weight of the cathode material. The total content of the element Al and the element Zr in the transition layer shows a decreasing trend in the direction from the surface layer of the cathode material to the core.

With the total weight of the cathode material as a reference, the content of the surface layer is 2.5% by weight, the content of the transition layer is 5.5% by weight, and the content of the core is 91% by weight.

NCM is $Li_{1+m}Ni_{1-x-y}Co_xMn_yO_2$. NCA is $Li_{1+m}Ni_{1-x-y1}Co_xA_{y1}O_2$. $0.01 \leq y1 \leq 0.15$. NCMA is $Li_{1+m}Ni_{1-x-y-z}Co_xMn_yAO_2$. $0 \leq m \leq 0.1$, $0.01 \leq x \leq 0.05$, $0.01 \leq y \leq 0.05$, and $0.01 \leq z \leq 0.1$. A represents Zr and Al. A mass ratio of Al to Zr is 2:3. The average particle size of NCM is 2.2 μm. The thickness of NCA is approximately 20 nm. The thickness of NCMA is approximately 40 nm.

As a result, the performance of the prepared cathode material is tested as shown in Tables 1 and 2. Table 1 shows the content of free lithium on the surface of the cathode material, and Table 2 shows the I(003)/I(104) ratio.

Embodiment 8

The embodiment is intended to describe a cathode material prepared by using the method of the present disclosure.

A cathode material is prepared according to a method the same as that in Embodiment 1. A difference lies in that in step (3), the calcination temperature is 850° C.

The content of the element Al in the surface layer accounts for 2% by weight of the total weight of the cathode material. The content of the element Al in the transition layer accounts for 1% by weight of the total weight of the cathode material. The content of the element Al in the transition layer shows a decreasing trend in the direction from the surface layer of the cathode material to the core.

With the total weight of the cathode material as a reference, the content of the surface layer is 2.5% by weight, the content of the transition layer is 6.5% by weight, and the content of the core is 91% by weight.

NCM is $Li_{1+m}Ni_{1-x-y}Co_xMn_yO_2$. NCA is $Li_{1+m}Ni_{1-x-y1}Co_xAl_{y1}O_2$. $0.01 \leq y1 \leq 0.15$. NCMA is $Li_{1+m}Ni_{1-x-y-z}Co_xMn_yAl_zO_2$. $0 \leq m \leq 0.1$, $0.01 \leq x \leq 0.05$, $0.01 \leq y \leq 0.05$, and $0.01 \leq z \leq 0.1$. The average particle size of NCM is 2.2 μm. The thickness of NCA is approximately 20 nm. The thickness of NCMA is approximately 40 nm.

As a result, the performance of the prepared cathode material is tested as shown in Tables 1 and 2. Table 1 shows the content of free lithium on the surface of the cathode material, and Table 2 shows the I(003)/I(104) ratio.

Contrast Embodiment 1

A cathode material is prepared according to a method the same as that in Embodiment 1. A difference lies in that there is no coating operation in a preparation process. That is, a lithium-nickel-cobalt-manganese oxide material is prepared in Contrast Embodiment 1.

The prepared cathode material is an ellipsoidal single crystal material with an average particle size of 2.0 μm.

As a result, the performance of the prepared cathode material is tested as shown in Tables 1 and 2. Table 1 shows the content of free lithium on the surface of the cathode material, and Table 2 shows the I(003)/I(104) ratio.

In addition, FIG. 1 is a comparison diagram of the cycle performance of a cathode material prepared according to Contrast Embodiment 1 and Embodiment 1. A curve 1 shows the cycle performance of an NCM/NCMA/NCA composite material prepared according to Embodiment 1 at 45° C. A curve 2 shows the cycle performance of NCM without a surface coating prepared according to Contrast Embodiment 1 at 45° C. As can be seen from FIG. 1, the NCM/NCMA/NCA composite material of the present disclosure has more stable cycle performance.

Contrast Embodiment 2

A cathode material is prepared according to a method the same as that in Embodiment 1. A difference lies in that manganese sulfate is replaced with aluminum sulfate. That is, a lithium-nickel-cobalt-aluminum oxide material is prepared.

The prepared cathode material is an ellipsoidal single crystal material with an average particle size of 2.0 μm.

As a result, the performance of the prepared cathode material is tested as shown in Tables 1 and 2. Table 1 shows the content of free lithium on the surface of the cathode material, and Table 2 shows the I(003)/I(104) ratio.

Contrast Embodiment 3

A cathode material is prepared according to a method the same as that in Embodiment 1. Differences lie in that NCM and NCA are separately synthesized and then mixed, and NCA is coated on the surface of NCM.

NCM and NCA are prepared by using the methods according to Embodiment 1 and Contrast Embodiment 2 respectively, and are then mixed in a manner of ball milling in a particular proportion (a content of aluminum in the mixture is the same as that in Embodiment 1), and the mixture is sintered at a particular temperature to obtain an NCM/NCA sample.

As a result, the performance of the prepared cathode material is tested as shown in Tables 1 and 2. Table 1 shows the content of free lithium on the surface of the cathode material, and Table 2 shows the I(003)/I(104) ratio.

TABLE 1

| Embodiment | Lithium hydroxide (ppm) | Lithium carbonate (ppm) |
|---|---|---|
| Embodiment 1 | 823.4 | 1556.8 |
| Embodiment 2 | 955.3 | 1226.2 |
| Embodiment 3 | 1059.4 | 1696.7 |
| Embodiment 4 | 935.4 | 1670.5 |
| Embodiment 5 | 855.2 | 1433.8 |
| Embodiment 6 | 1043.5 | 1715.5 |
| Embodiment 7 | 722.5 | 1322.5 |
| Embodiment 8 | 872.3 | 1256.8 |
| Contrast Embodiment 1 | 1523.4 | 2454.6 |
| Contrast Embodiment 2 | 1143.2 | 1605.4 |
| Contrast Embodiment 3 | 1230.4 | 2210.5 |

As can be seen from Table 1, forms of free lithium on surfaces of cathode materials prepared according to Embodiments 1 to 8 and Contrast Embodiments 1 to 3 include lithium hydroxide and lithium carbonate. Contents of lithium hydroxide and lithium carbonate in Embodiments 1 to 8 are less than contents of lithium hydroxide and lithium carbonate in Contrast Embodiments 1 and 3. It indicates that a composite material has a more stable surface and less free lithium on the surface as compared with a single uncoated material, which is more conducive to treatment and a battery capacity. In addition, in Contrast Embodiment 2, NCA is very stable, and the content of free lithium on the surface is therefore not very high. However, the capacity of the NCA is relatively low.

TABLE 2

| Embodiment | I(003)/I(104) |
|---|---|
| Embodiment 1 | 1.44 |
| Embodiment 2 | 1.57 |
| Embodiment 3 | 1.41 |
| Embodiment 4 | 1.43 |
| Embodiment 5 | 1.52 |
| Embodiment 6 | 1.40 |
| Embodiment 7 | 1.50 |
| Embodiment 8 | 1.41 |
| Contrast Embodiment 1 | 1.21 |
| Contrast Embodiment 2 | 1.40 |
| Contrast Embodiment 3 | 1.35 |

As can be seen from Table 2, the I(003)/I(104) ratios of the cathode materials prepared according to Embodiments 1 to 8 are greater than those in Contrast Embodiments 1 and 3. The reason is that, generally, when the I(003)/I(104) ratio is higher, it may be usually considered that the degree of $Li^+/Ni^{2+}$ mixing is lower. For example, it can be seen by comparing Embodiment 1 and Contrast Embodiment 1 that the cathode material prepared according to Embodiment 1 has a lower degree of $Li^+/Ni^{2+}$ mixing than that of NCM alone, indicating a more stable structure and a low degree of mixing, so that more lithium ions may be freely intercalated and deintercalated during charging and discharging, and the capacity of the material is higher. In addition, in Contrast Embodiment 2, NCA is relatively stable in nature, which also results in a low degree of Li/Ni mixing in Contrast Embodiment 2 when NCA is used to coat NCM. However, NCA alone does is not advantageous in terms of battery capacity.

Test Embodiment

To evaluate the electrochemical performance of the materials, the cathode materials prepared according to Embodiments 1 to 8 and Contrast Embodiments 1 to 3 are used to manufacture batteries for testing. The results are shown in Table 3 and Table 4. Table 3 shows a comparison of gram capacity and cycle performance, and Table 4 shows a comparison of storage performance at 60° C. for 60 days.

TABLE 3

| Embodiment | Gram capacity (mAh/g) | Capacity retention rate of 500 cycles at 45° C. (%) |
|---|---|---|
| Embodiment 1 | 199.3 | 91.5 |
| Embodiment 2 | 197.3 | 90.7 |
| Embodiment 3 | 196.2 | 88.6 |
| Embodiment 4 | 197.5 | 86.3 |
| Embodiment 5 | 196.4 | 91.2 |
| Embodiment 6 | 203.5 | 86.6 |
| Embodiment 7 | 200.3 | 93.4 |
| Embodiment 8 | 196.5 | 87.1 |
| Contrast Embodiment 1 | 198.2 | 79.4 |
| Contrast Embodiment 2 | 195.3 | 85.5 |
| Contrast Embodiment 3 | 195.5 | 83.3 |

The electrochemical test results in Table 3 indicate that:

(1) The gram capacity in Contrast Embodiment 1 (NCM with a nickel content of 90%) is 198.2 mAh/g. The gram capacity in Contrast Embodiment 2 (NCA) is 195.3 mAh/g. The gram capacity in Contrast Embodiment 3 (NCM/NCA) is 195.5 mAh/g. The gram capacity in Embodiment 1 (an Al-doped composite material) is 199.3 mAh/g. It indicates that a composite material is more advantageous than single NCM and NCA in terms of capacity (2) At 45° C., after 500 cycles of constant-current constant-voltage charging and discharging, the capacity retention rate in Contrast Embodiment 1 (NCM) is 79.4%, the capacity retention rate in Contrast Embodiment 2 (NCA) is 85.5%, and the capacity retention rate in Contrast Embodiment 3 (NCM/NCA) is 83.3%, and the capacity retention rate in Embodiment 1 (the Al-doped composite material) is greater than 90%. It indicates that such a core-shell-like structure with a transition layer is structurally more stable and can effectively slow down the degradation of battery material performance.

TABLE 4

| Embodiment | Capacity retention rate (%) | Capacity restoration ratio (%) | DCIR change rate (%) |
|---|---|---|---|
| Embodiment 1 | 93 | 96 | 10 |
| Embodiment 2 | 91 | 93 | 12 |
| Embodiment 3 | 89 | 92 | 13 |
| Embodiment 4 | 90 | 93 | 16 |
| Embodiment 5 | 92 | 95 | 15 |
| Embodiment 6 | 87 | 91 | 10 |
| Embodiment 7 | 93 | 95 | 11 |
| Embodiment 8 | 89 | 93 | 12 |
| Contrast Embodiment 1 | 85 | 89 | 20 |
| Contrast Embodiment 2 | 88 | 91 | 19 |
| Contrast Embodiment 3 | 86 | 90 | 17 |

The electrochemical test results in Table 4 indicate that:

After high temperature storage at 60° C., the capacity retention rate in Contrast Embodiment 1 (NCM) is 85%, the restoration ratio is 89%, and the DCIR (direct current internal resistance) rises by approximately 20% at a state of charge (SOC) of 60%. under the same conditions, the retention rate in Contrast Embodiment 2 (NCA) is 88%, the restoration ratio is 91%, and the DCIR at an SOC of 60% rises by 19%. However, Embodiment 1 (the Al-doped composite material) shows adequate stability, the corresponding battery capacity retention rate after storage is 93%, the capacity restoration ratio reaches 96%, and the DCIR rises by 10%. It indicates that a composite material can effectively suppress the battery self-discharge phenomenon compared with a single material. The increase in the DCIR is usually related to side reactions on the surface of an electrode material. More side reactions cause more film formation on the surface of the material and increase impedance. Compared with a single material, a composite material has a more inert and stable surface.

The preferred embodiments of the present disclosure are described in detail above, but the present disclosure is not limited to the specific details in the above embodiments. Various simple variations may be made to the technical solutions of the present disclosure within the scope of the technical idea of the present disclosure, and such simple variations shall all fall within the protection scope of the present disclosure.

It should be further noted that the specific technical features described in the above specific embodiments may be combined in any suitable manner without contradiction. To avoid unnecessary repetition, various possible combinations are not further described in the present disclosure.

In addition, different implementations of the present disclosure may also be arbitrarily combined without departing from the idea of the present disclosure, and these combinations shall still be considered as content disclosed in the present disclosure.

In the descriptions of this specification, descriptions using reference terms "an embodiment", "some embodiments", "an example", "a specific example", or "some examples" mean that specific characteristics, structures, materials, or features described with reference to the embodiment or example are included in at least one embodiment or example of the present disclosure. In this specification, schematic descriptions of the foregoing terms are not necessarily directed at the same embodiment or example. Besides, the specific features, the structures, the materials or the characteristics that are described may be combined in proper manners in any one or more embodiments or examples. In addition, a person skilled in the art may integrate or combine different embodiments or examples described in the specification and features of the different embodiments or examples as long as they are not contradictory to each other.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A composite cathode material for a lithium-ion battery, wherein a core of the cathode material is a lithium-nickel-cobalt-manganese oxide material, a surface layer of the cathode material is a lithium-nickel-cobalt oxide material doped with an element E, there is a transition layer between the core and the surface layer, the transition layer is a lithium-nickel-cobalt-manganese oxide material doped with the element E, and a content of the element E in the transition layer shows a decreasing trend in a direction from the surface layer of the cathode material to the core;

a general formula for the composition of the transition layer is $Li_{1+m}Ni_{1-x-y-z}Co_xMn_yE_zO_2$, wherein $0 \leq m \leq 0.1$, $0.01 \leq x \leq 0.1$, $0.01 \leq y \leq 0.1$, and $0.01 \leq z \leq 0.1$;

E is one or more of Al, Zr, Ti, Y, Ba, and Sr; and wherein with the total weight of the cathode material as a reference, the content of the transition layer accounts for 0.5% to 12% by weight.

2. The cathode material according to claim 1, wherein the cathode material is a single crystal material.

3. The cathode material according to claim 1, wherein a content of the element E in the surface layer accounts for 0.5% to 8% by weight of a total weight of the cathode material, and the content of the element E in the transition layer accounts for 0.05% to 5% by weight of the total weight of the cathode material.

4. The cathode material according to claim 1, wherein a thickness of the transition layer is 5 nm to 200 nm.

5. The cathode material according to claim 1, wherein a general formula for the composition of the core is $Li_{1+m}Ni_{1-x-y}Co_xMn_yO_2$, where $0 \leq m \leq 0.1$, $0.01 \leq x \leq 0.1$, and $0.01 \leq y \leq 0.1$.

6. The cathode material according to claim 1, wherein a molar content of nickel in the core accounts for not less than 80% of the total moles of the core.

7. The cathode material according to claim 1, wherein the core has an average particle size of 1.5 μm to 2.5 μm.

8. The cathode material according to claim 1, wherein with the total weight of the cathode material as a reference, a content of the core accounts for 80% to 98% by weight.

9. The cathode material according to claim 1, wherein with the total weight of the cathode material as a reference, the content of the core accounts for 90% to 98% by weight.

10. The cathode material according to claim 1, wherein a general formula for the composition of the surface layer is $Li_{1+m}Ni_{1-x-y1}Co_xE_{y1}O_2$, wherein $0.01 \leq y1 \leq 0.15$.

11. The cathode material according to claim 1, wherein a thickness of the surface layer is 5 nm to 50 nm.

12. The cathode material according to claim 1, wherein with the total weight of the cathode material as a reference, a content of the surface layer accounts for at most 8% by weight.

13. The cathode material according to claim 1, wherein the element E is Al.

14. A lithium-ion battery, wherein the lithium-ion battery comprises a cathode and an anode, and the cathode is prepared by using the cathode material according to claim 1.

15. A vehicle, comprising the lithium-ion battery according to claim 14.

16. The cathode material according to claim 2, wherein a content of the element E in the surface layer accounts for 0.5% to 8% by weight of a total weight of the cathode material, and the content of the element E in the transition layer accounts for 0.05% to 5% by weight of the total weight of the cathode material.

17. The cathode material according to claim 16, wherein a thickness of the transition layer is 5 nm to 200 nm.

* * * * *